(12) United States Patent
Tomasin et al.

(10) Patent No.: US 7,720,134 B2
(45) Date of Patent: May 18, 2010

(54) FREQUENCY-DOMAIN MULTI-USER ACCESS INTERFERENCE CANCELLATION AND NONLINEAR EQUALIZATION IN CDMA RECEIVERS

(75) Inventors: Stefano Tomasin, Venice (IT); Nevio Benvenuto, Mogliano Veneto (IT); Fabio Osnato, Milan (IT); Marco Odoni, Monzambano (IT); Filippo Spalla, Pavia (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 1119 days.

(21) Appl. No.: 10/842,699

(22) Filed: May 10, 2004

(65) Prior Publication Data

US 2005/0249269 A1 Nov. 10, 2005

(51) Int. Cl.
*H04B 1/00* (2006.01)
(52) U.S. Cl. .................. 375/148; 375/144; 375/295; 375/296; 375/316; 37/343; 37/346
(58) Field of Classification Search .................. 375/148
See application file for complete search history.

(56) References Cited

U.S. PATENT DOCUMENTS

| 5,204,876 | A  | * | 4/1993  | Bruckert et al. ............. 375/130 |
| 6,154,443 | A  | * | 11/2000 | Huang et al. ................ 370/210 |
| 7,023,941 | B1 | * | 4/2006  | Rey et al. ................... 375/355 |
| 7,110,352 | B2 | * | 9/2006  | Wang et al. .................. 370/208 |
| 7,292,661 | B1 | * | 11/2007 | Chan et al. .................. 375/346 |
| 2003/0053526 | A1 | * | 3/2003 | Reznik ....................... 375/148 |
| 2004/0120274 | A1 | * | 6/2004 | Petre et al. .................. 370/320 |
| 2004/0141548 | A1 | * | 7/2004 | Shattil ....................... 375/146 |
| 2005/0135314 | A1 | * | 6/2005 | Giannakis et al. ........... 370/335 |

OTHER PUBLICATIONS

"Iterative detection and channel estimation for MC-CDMA" Thomas Zemen 2003 IEEE.*
"A Family of Multiuser Decision-feedback Detectors for Asynchronous Code-Division Multiple-Access Channel" by Alexandra Duel-Hallen IEEE Transactions on communications, vol. 43, No. 2/3/4, Feb./Mar./Apr. 1995.*
"Analysis of Predistortion, Equalization, and ISI cancellation Techniques in Digital Radio Systems with Nonliner Transmit Amplifiers" by Georges Karam. IEEE Transactions on Communications, vol. 37, No. 12, Dec. 1989.*
Jinho Choi, Seong Rag Kim, Cheng-Chew Lim, "Receivers With Chip-level Decision feedback Equalization for CDMA downlink Channels", IEEE transactions on wireless communications, vol. 3, No. 1, Jan. 2004.*

* cited by examiner

*Primary Examiner*—Shuwang Liu
*Assistant Examiner*—Dhaval Patel
(74) *Attorney, Agent, or Firm*—Lisa K. Jorgenson; Allen, Dyer, Doppelt, Milbrath & Gilchrist, P.A.

(57) ABSTRACT

A wireless CDMA communication system receiver receives a stream of chips generated by spreading data symbols formed by grouping bits of information at a wireless CDMA communication transmitter which are broadcast at a certain chip-rate. The received chips are de-spread and symbols pertaining to respective users are reconstructed. The stream of chips are formatted into blocks of chips, and an iterative block decision feedback equalization is performed in a frequency domain at the chip-rate of the broadcast stream of chips to remove inter-symbol interference by defining a transfer function. The chips generated are interleaved by spreading each data symbol being transmitted before broadcasting the stream of interleaved chips in distinct blocks of chips.

23 Claims, 4 Drawing Sheets

FREQUENCY-DOMAIN MULTI-USER ACCESS INTERFERENCE CANCELLATION AND NONLINEAR EQUALIZATION IN CDMA RECEIVERS

FIELD OF THE INVENTION

The invention relates to mobile transmission network systems and code division multiple access (CDMA) techniques, and more specifically, to frequency-domain interference and non-linear equalization in CDMA systems.

BACKGROUND OF THE INVENTION

The latest generation of mobile networks requires an ever expanded capacity to support high-rate multimedia applications on a common communication channel [1]. Since the spectrum is dynamically assigned to users, an access scheme is needed to share the radio transmission resources. Among the various alternatives proposed, many are based on the technique known as code division multiple access (CDMA) due to its flexibility and low-cost implementation.

According to the CDMA technique, bits of information are produced at a certain bit rate. For example, if a bit is produced every $T_b$ seconds, the rate is $1/T_b$. The bits of information that are produced are grouped to form spectrum symbols to be broadcast at a certain symbol rate. For example, if there are 4 bits for each symbol, the symbol rate of transmission will correspond to $1/T=\frac{1}{4}T_b$.

From each symbol to be broadcast N_S chips are obtained and are eventually broadcast in a block format. Therefore, the chip-rate is the rate at which the chips are generated. For the considered example, the chip-rate is N_S/T.

Figure 1:
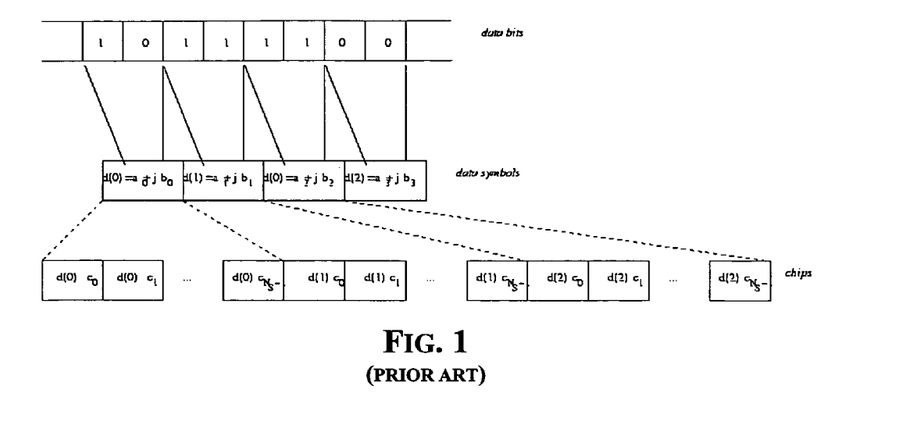
FIG. 1 illustrates a scheme according to the prior art in which data bits are grouped to form data symbols, and from which a number of respective chips to be broadcast are obtained.

A scheme according to which data bits are grouped to form data symbols and from which a number of respective chips are obtained is illustrated in FIG. 1. Unfortunately, multipath propagation of the channel of each user significantly affects performance of CDMA transmissions. In fact, channel dispersion disrupts orthogonality among codes of different users causing multi-user access interference (MAI). Multi-user access interference (MAI) means that any block of a de-spread signal will not ideally contain the spread chips belonging to a certain CDMA symbol. On the contrary, it will contain beside the spread chips of the CDMA symbol pertaining to the user and incumbent noise but also the spread chips of CDMA symbols pertaining to other users. Interference among the transmitted chips of a CDMA symbol of the user is known as interchip interference (ICI). As a consequence, de-spreading of the received chips within the receiver may sometimes not properly restore the data signal with the effect of producing so-called inter-symbol interference (ISI).

To contrast MAI, ICI and ISI, various receiver architectures have been proposed. One of the most common approaches is the rake receiver [2], which for moderately dispersive channels provides a good trade-off between complexity and performance. As channel dispersion increases, the performance of this receiver significantly degrades. Top performance receivers should include multi-user detection (MUD), whereby more users may be simultaneously detected [3]. A suboptimal, but still effective MUD technique is that of interference cancellation (IC), according to which, in cascade of a bank of rake receivers, data of all users are detected to permit tentative decisions that are used to construct MAI, which as purposely reconstructed may be then cancelled out of the received signal. Two IC schemes have been proposed: serial IC (SIC) and parallel IC (PIC).

According to the SIC scheme, at each stage only one user is detected and its interference contribution is canceled before detecting the next user and so forth. According to the PIC scheme, simultaneous detection of all users and IC are performed iteratively. However, the performance of known SIC and PIC schemes with rake receivers remains affected by ICI and ISI. Moreover, because the rake receivers operate at the chip-rate, computational complexity of such SIC and PIC schemes may become significant for channels with more than just a few taps.

To curb ICI, linear equalizers operating at the chip-rate have been studied [4], [5], and a joint equalization and MUD scheme has been proposed [6]. With regard to non-linear approaches, a common equalization structure comprises a feed-forward filter operating at the chip-rate, and a feedback filter which is fed with prior detected symbols [7]-[11]. A scheme that iterates IC and linear equalization has been proposed [11] according to which coding step is included in the iterative process. This increases significantly the overall complexity.

All these receiver structures operate in the time domain (TD) at the chip-rate, hence their computational complexity is quite high. To reduce complexity, two efficient implementations of PIC have been investigated [12]. The first concentrates the IC only on the most significant terms, while the second exploits the multistage organization of PIC to avoid double calculations.

Another structure has been proposed in [13], wherein design and performance evaluations are derived for channels with particular statistical properties and for the asymptotic case of infinite length filters. The efficiency of the receiver is enhanced by implementing all filters in the frequency domain (FD) through element-wise products of discrete Fourier transforms (DFTs), and the resulting structure is denominated FD-IC. Equivalence between time-domain filtering and the DFT products is ensured by employing a special transmission format of data block, according to which the stream of chips is divided into blocks separated either by a cyclic extension or by a fixed PN sequence [14], [15]. Drawbacks of this structure are a slight bandwidth inefficiency due to the data block extension, and an increased latency because detection is performed on blocks of CDMA symbols.

At the receiver, for each stage of the IC process, a block DFE step is iterated with a detection step. In particular, for each user, at the first iteration only the feed-forward (FF) filter is active and a tentative decision on data is produced. At the next iterations, decisions already produced during previous iterations are used to generate the feedback (FB) filter input signal, the output of which is added to the FF filter output before the new data detection, [11]. Notwithstanding the fact that the coefficients of both FF and FB filters are varied, depending on the reliability of the detected data at the previous iteration when studying the performance of many channels, error propagation in the DFE block becomes significant due to the CDMA spreading, whereby an error on one symbol generates a burst of wrong chips.

SUMMARY OF THE INVENTION

In view of the foregoing background, an object of the present invention is to reduce multi-user access interference (MAI) and provide for equalization of intersymbolic interference at a CDMA receiver.

In view of the limits and complexities of the known CDMA receivers discussed above, an effective approach to significantly improve the performance of either an SIC or a PIC technique of cancellation of the multi-user access interference and of intersymbolic interference (ISI) equalization is provided.

According to the present invention, a significant enhancement of performance without any substantial increase of complexity is achieved through an equalization process of intersymbolic interference carried out in the frequency domain by associating a data block extension with either a cyclic prefix or with a known sequence to an interleaving of the transmitted chips.

Simulations have been performed for the FD-IC scheme using PIC on an uplink wireless broadband channel, and the results show that the FD-IC significantly out performs existing IC schemes based on the rake receiver due to its ability to efficiently combat ISI.

DETAILED DESCRIPTION OF THE PREFERRED EMBODIMENTS

For ease of explanation the ensuing description is divided in the following sections: 1) The System Model—which illustrates an embodiment of the system and the data transmission format that is used for an FD implementation of the receiver and the interleaving that is implemented at a chip level; 2) Interference Cancellation and DFE—which describes the FD implementation of both SIC and PIC and the iterative block DFE detector; and 3) Design Methods—which illustrates the manner in which the filter coefficients of the DFE are defined.

System Model. In terms of notation, a signal is denoted with a lowercase letter, while its DFT is denoted with the corresponding uppercase letter. Vectors and matrices are denoted with letters, and * denotes complex conjugate.

In a wideband CDMA communication system, where K users are transmitting simultaneously, codes with spreading factor $N_S$ are used. For the user k, the data signal $d^{(k)}(n)$, at rate 1/T, is spread with the code $c^{(k)}(m)$, m=0, 1, ..., $N_S$−1 to obtain the data sequence (chips)

$$q^{(k)}(m+nN_S)=c^{(k)}(m)d^{(k)}(n), k=0, 1, \ldots, K-1, \quad (1)$$

having rate $N_S$/T. After spreading, chips are interleaved as detailed below to obtain the signal $s'^{(k)}(n)$. For transmission, $s'^{(k)}(n)$ is modulated with the pulse-shaping transmit filter. In a wideband uplink transmission, for each user the channel can be modeled as the sum of delayed paths with different attenuations and phases.

At the base station, the received signal is filtered by a filter matched to the transmit pulse shape and then sampled at the rate $1/(TN_S)$, [2]. By denoting with $h^{(k)}(q)$, q=0, 1, ..., $N_q$−1, the discrete-time base band equivalent impulse response of the channel for the user k, including pulse shaping and matched filtering, the received discrete-time signal comprises the sum of the signals of all users, i.e., $$r'(l) = \sum_{k=0}^{K-1} r'^{(k)}(l) + w(l) = \sum_{k=0}^{K-1} \sum_{q=0}^{N_q-1} h^{(k)}(q)s'^{(k)}(l-q) + w(l), \quad (2)$$

where w(l) is the complex additive white Gaussian noise (AWGN) term, having zero mean and variance $N_0/2$ per dimension.

If despreading with the code of the user k is directly applied to r'(l), the obtained signal will be affected by MAI and ISI. Therefore, as already mentioned in the introduction, use of special and generally more complex receivers becomes unavoidable. According to the invention, a receiver is provided that includes joint IC and equalization functions, and wherein filtering is performed in the FD.

Data Transmission Format. To implement filter operations as a product of DFTs on sampled blocks of size P, the convolution between the channel impulse response and the transmitted data signal must be circular on blocks of size P. Two methods for forcing the circularity that have been proposed recently are briefly discussed below.

In [14] it has been proposed to append to each block of M information data $$s'^{(k)}(m)=[s'^{(k)}(mM), s'^{(k)}(mM+1), \ldots, s'^{(k)}(mM+M-1)] \quad (3)$$

a known PN sequence $[p(0), p(1), \ldots, p(L-1)]$. The extended data block of length P=M+L is given by $$s^{(k)}(m) = [s^{(k)}(mP), s^{(k)}(mP+1), \ldots, s^{(k)}(mP+P-1)] \quad (4)$$
$$= [s'^{(k)}(mM), s'^{(k)}(mM+1), \ldots, s'^{(k)}(mM+M-1),$$
$$p(0), p(1), \ldots, p(L-1)].$$

This extension is denoted as zero-padding in the case p(n)=0, n=0, 1, ..., L−1, [16]. Note that an additional PN extension is required before the first data block.

Another technique that forces the convolution to be circular is the cyclic-prefix (CP) extension, where the first L symbols coincide with the last symbols of the extended blocks, i.e., $$s^{(k)}(m)=[s'^{(k)}(mM), s'^{(k)}(mM+1), \ldots, s'^{(k)}(mM+M-1),$$
$$s'^{(k)}(mM), \ldots, s'^{(k)}(mM+L-1)]. \quad (5)$$

Here the convolution is circular on blocks of size P=M. Such a CP transmission has been proposed for use in multi-carrier communications [15] and has also been proposed for single carrier transmissions with linear FD equalization, [17], [18]. Note that, while according to the DFE technique proposed in [14], where the FB operates in the time domain, only the PN-extension method may be used. In the CP method of [15], [17] and [18] there is no such limitation.

However, the PN-extension method yields a better performance than the CP method because it implies a reduced error propagation phenomena in the block DFE. For the same bandwidth efficiency, the CP method has a reduced complexity since DFTs are performed on blocks of size M instead of P.

In the following description the PN-extension method will be considered for illustrative purposes. However, variations of the implementation of this invention for the case of a CP method are straightforward and will be immediately recognized by a skilled person. To simplify the notation, the block index m will be omitted since all operations are performed on blocks of P samples of the received signal.

Chip Interleaving. In a DFE, the use of past detected data produces an error propagation phenomena. The impact of errors is particularly significant because of CDMA transmission and the FD implementation of the DFE. In fact, the error on one data symbol is propagated by the spreading on an entire CDMA symbol (i.e., $N_S$ chips), thus generating a burst of errors.

It has been found that error propagation may be significantly reduced if the chips are interleaved before transmission. Because data must be detected at each block to allow DFE, the interleaver must operate separately on each block of transmitted chips.

In particular, a row-column block interleaver where the M information chips are written in a matrix column-wise and read row-wise [2] is a preferred embodiment. The ensuing description will assume the use of such an interleaver.

Figure 2:
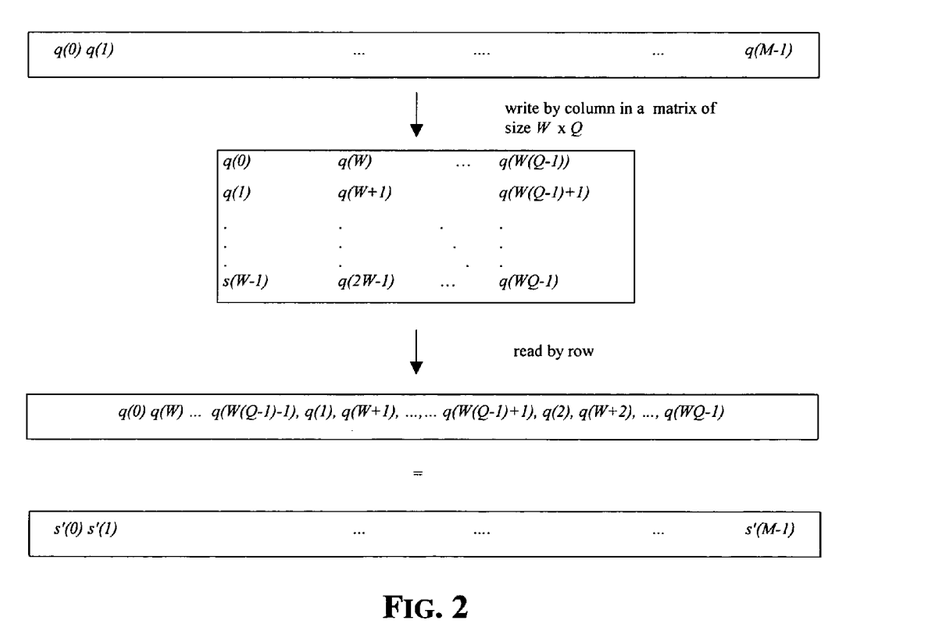
FIG. 2 shows according to the present invention how a step of chip interleaving is performed, for example with a matrix interleaver of size W×Q, with WQ=M.

FIG. 2 shows an example of chip interleaving with a row-column interleaver of size W×Q, with WQ=M. Note that the superscript $(k)$ has been omitted for ease of notation.

Interference Cancellation and DFE. The most common structure for wideband CDMA transmissions comprises a rake, i.e., a filter matched to the channel impulse response, followed by a despreader and a detector. In our FD implementation, the matched filter operation yields the FD signal $$Y_p^{(k)} = H_p^{(k)*} R_p, p = 0, 1, \ldots, P-1 \quad (6)$$

Note that in an FD implementation, no reduction of complexity is achieved by considering only a subset of the coefficients (fingers) of the channel impulse response. In a traditional basic receiver, after the matched filter, the vector $$Y_p^{(k)} = [Y_0^{(k)}, Y_1^{(k)}, \ldots, Y_{P-1}^{(k)}]$$

would be transformed into the time domain by an IDFT. The signal is then despread. Lastly, detection is performed.

In an advanced receiver, the impact of MAI can be reduced by applying an interference cancellation scheme where, starting with an initial tentative decision of symbols of one or more users, their interference contribution is generated and subtracted from the receiver signal. After cancellation and despreading have been performed, a new detection is applied. Of course, the cancellation and detection procedures may be iterated a few times to increase the reliability of data.

Figure 3:
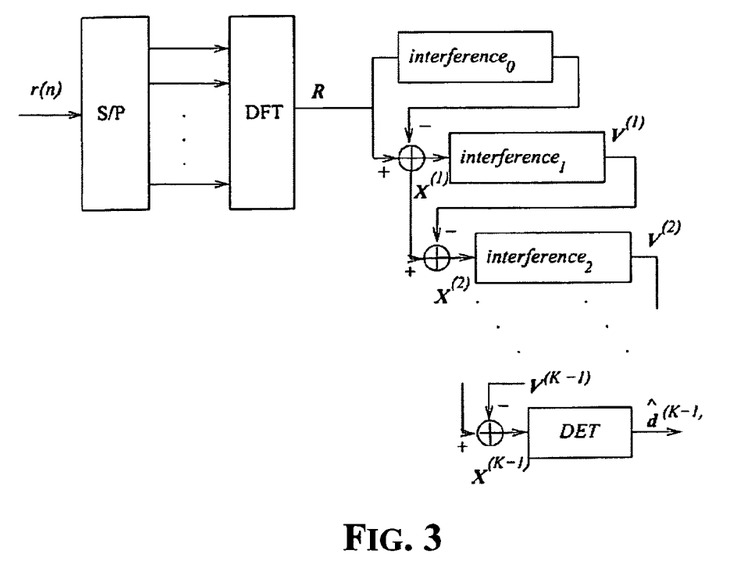
FIG. 3 shows the general architecture for performing SIC in the frequency domain according to the present invention.
Figure 4:
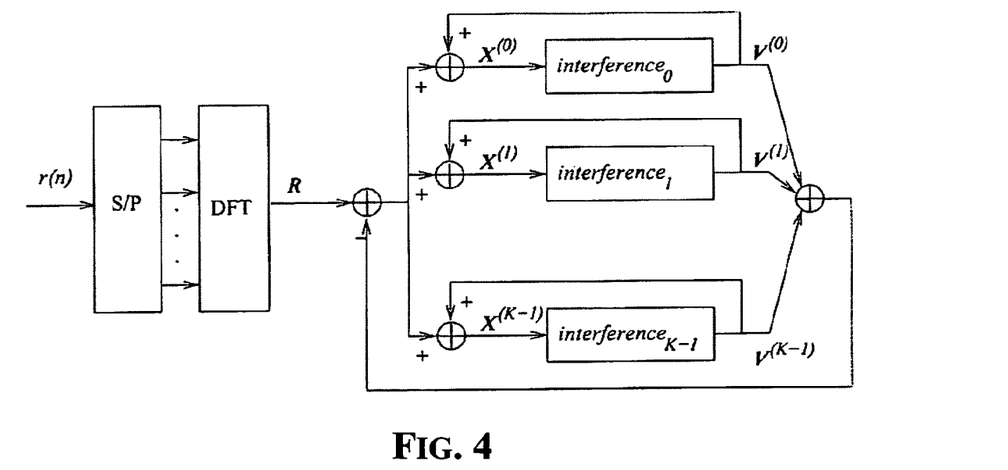
FIG. 4 shows the general architecture for performing PIC in the frequency domain according to the present invention.
Figure 5:
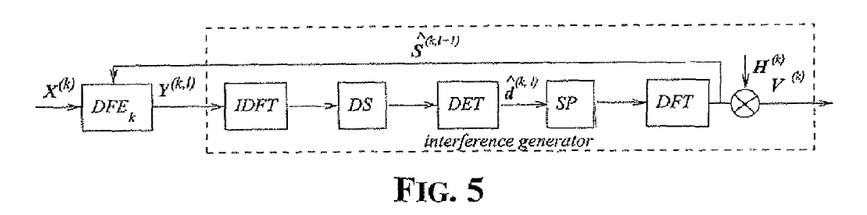
FIG. 5 shows the architecture of the interference$_k$ blocks in the frequency domain according to the present invention, each interference block comprises a DFE and an interference generator including a despreader followed by a detector and a spreader whose output feeds both the FB filter of the DFE and an interference pulse-shaping filter.

Serial Interference Cancellation (SIC). In SIC, the IC is performed serially for each user and its FD implementation (FD-SIC) is shown in FIG. 3. The received signal is first divided into blocks of size P by a serial to parallel converter (S/P), and each block is transformed into the FD by means of a DFT of size P, to obtain $$R_p(m) = \sum_{l=0}^{P-1} e^{-j2\pi l p/P} r(mP+l), p = 0, 1, \ldots P-1. \quad (7)$$

Similarly, let's denote with $S^{(k)}(m)$, W(m) and $H^{(k)}$ the DFTs of $s^{(k)}(m)$, w(m) and $h^{(k)}$, respectively. The received signal can be written in the frequency-domain as $$R_p(m) = \sum_{k=0}^{K-1} H_p^{(k)} S_p^{(k)}(m) + W_p(m). \quad (8)$$

The following operations perform a multistage detection and IC of each user signal. At the first stage, R is used as input of the block interference$_0$, which performs data detection of the user k=0 and the subsequent interference generation which is canceled from the input of the next stage. In general, in the basic SIC receiver, the interference$_k$ block includes the matched filter $H^{(k)*}$ (or rake), the despreader and the detector which generates the signal $d^{(k)}$. To obtain the interference contribution in the FD, $V^{(k)}$, $d^{(k)}$ is first spread to form $s'^{(k)}$ which in turn yields the augmented block $s^{(k)}$ by appending the PN sequence (see (5)). $s^{(k)}$ is then transformed into the FD to obtain the vector $S^{(k)}$, which is multiplied by the frequency response of the corresponding channel, i.e., $$V_p^{(k)} = H_p^{(k)} S_p^{(k)}, p = 0, 1, \ldots, P-1. \quad (9)$$

A more detailed description of the interference$_k$ block will be presented in the following. With regards to FIG. 3, each stage of SIC includes cancellation of the interference contribution of previously detected users. Hence, the input of the interference$_k$ block is given by $$X^{(k)} = R - \sum_{l=0}^{k-1} V^{(l)} \quad (10)$$
$$= X^{(k-1)} - V^{(k-1)}, k = 1, 2, \ldots, K-1.$$

The order of cancellation of the various users is varied according to the power of the received user signals and their interference contribution to other users, [19]. In fact, the effect of MAI on the $X^{(k)}$ signal diminishes from the first to the last stage, and for equal user bit error rates (BER) proper power control must be implemented [20].

Figure 6:
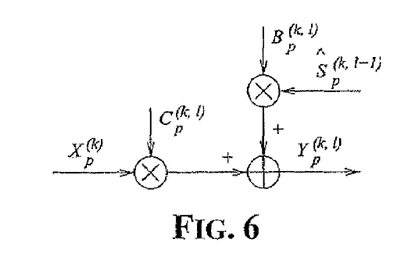
FIG. 6 illustrates the frequency domain implementation of the DFE$_k$ according to the present invention.

Parallel Interference Cancellation (PIC). In PIC, IC is performed in parallel for all users and its FD implementation (FD-PIC) is shown in FIG. 6. As in SIC, also here the interference$_k$ block performs detection and generation of the interference contribution of user k. The following operations perform iteratively detection and IC of user signals for I times. Reference is made to PIC iterations in the parallel IC process to avoid confusion with term iteration which is reserved for the equalization-detection process.

At the first PIC iteration (i=1), all feedback signals of FIG. 6 are not active and the received signal is applied to a bank of interference$_k$ blocks, performing parallel detection of all user data signals and generation of MAI. At PIC iterations i=2, 3, ..., I, the input to each interference$_k$ block is obtained by canceling from the received signal the MAI due to all other users, as shown in the efficient implementation of FIG. 6. In this case, the signal at the input of the interference$_k$ block is $$X^{(k)} = R - \sum_{l=0, l \neq k}^{K-1} V^{(l)}, k = 0, 1, \ldots, K-1. \quad (11)$$

As an alternative, cancellation could include also ISI [21], and in this case $$X_P^{(k)} = R_P - [H_P^{(k)} - e^{-j2\pi p\Delta_l/P} h^{(k)}(\Delta_k)] \hat{S}_P^{(k)} - \sum_{l=0, l \neq k}^{K-1} V_P^{(k)}, \quad (12)$$

$$k = 0, 1, \ldots, K-1,$$

p=0, 1, ..., P−1, where $\Delta_l$ is the delay corresponding to the coefficient with the largest amplitude of the channel impulse response of user l.

Note that in the scheme of FIG. 6 the IC removes the contribution of other users. To take into account the reliability of the tentative decision, in [22] it is proposed to weight the signals before cancellation and obtain a trade-off between cancellation of interference and insertion of a disturbance due to decision errors. This weighting can be easily accomplished in the FD-PIC scheme by multiplying $V^{(k)}$ with an appropriate gain before cancellation.

For a coded transmission, since all operations are performed on blocks of CDMA symbols, the detected signal can be also decoded before FD-PIC is performed, [11].

Equalization and Interference Generation. Both FD-PIC and FD-SIC include the interference$_k$ blocks that will be described here in more detail. While the outer IC is used to reduce MAI, the purpose of the interference$_k$ block is to regenerate the interference due to user k in the received signal. Indeed, this signal is affected by ISI, and for better detection (and hence regeneration), a DFE is used.

In other words, the traditional matched filter (or rake) used in prior art architectures is substituted according to an aspect of the invention with an iterative DFE to reduce ISI. Contrary to the DFE proposed in [9], where the FB signal was designed to cancel only the interference among contiguous CDMA symbols, according to the approach of the invention the DFE operates at the chip-rate, hence it is more effective in equalizing.

Figure 7:
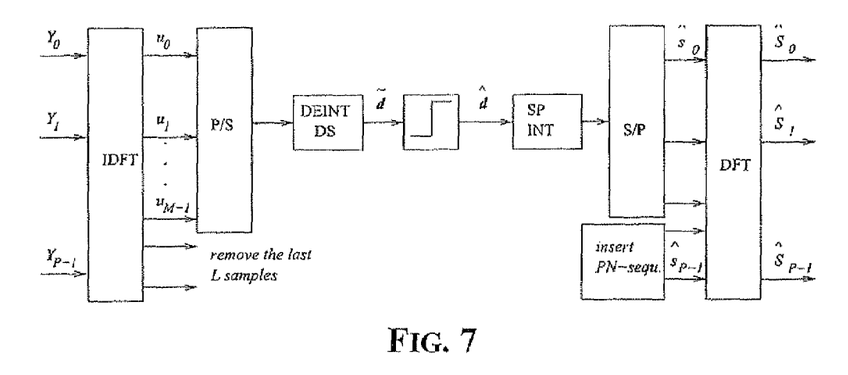
FIG. 7 shows a cascade arrangement of the IDFT, DS, DET, SP and DFT blocks according to the present invention.

The functional diagram of each interference$_k$ block is shown in FIG. 7. Note that, due to the CDMA transmission format, a time-domain DFE can not be applied directly on the received signal, since despreading must be performed on blocks of chips before the FB signal is available.

According to the invention, an implementation of a block DFE operating in the FD is described, wherein equalization and detection are iterated v times on the input signal $X^{(k)}$. In view of the fact that all FD signals are already available, the DFE scheme reduces to the simple operations shown in FIG. 6.

At the iteration l, the feed-forward filter is implemented in the FD by the element-wise complex multiplication of $X^{(k)}$ with the vector of the FF filter coefficients $$C^{(k,l)} = [C_0^{(k,l)}, C_1^{(k,l)}, \ldots, C_{P-1}^{(k,l)}], l = 1, 2, \ldots, v.$$

The FB filter coefficients in the FD are denoted as $$B^{(k,l)} = [B_0^{(k,l)}, B_1^{(k,l)}, \ldots, B_{P-1}^{(k,l)}].$$

When the DFE is first applied (l=1) to the received vector signal, no previous decision is available and the feedback signal is not active, i.e., $B_p^{(k,l)}=0$, p=0, 1, ..., P−1. In this case the DFE$_k$ becomes a linear equalizer and the resulting vector signal has elements $$Y_p^{(k,l)} = X_p^{(k)} C_p^{(k,l)}, p=0, 1, \ldots, P-1. \quad (13)$$

$Y^{(k,l)}$ is then transformed into the time domain by IDFT. After de-spreading (DS), detection (DET) yields the tentative decision vector $d^{(k,l)}$.

The detailed description of the various blocks is shown in FIG. 7, where parallel to serial conversion is denoted with P/S. Note that after the IDFT of the vector signal $Y^{(k,l)}$ the last L symbols are discarded before de-interleaving (DEINT) and de-spreading is performed, and detection follows. There are also linear IC schemes that do not include detection [24].

A new equalization iteration can now be applied. First, the detected data block $d^{(k,l)}$ is regenerated by spreading (SP), interleaving (INT) and PN insertion. The whole block is transformed in the FD by DFT to obtain the data vector $S^{(k,l)}$. Then, equalization of the input signal is performed which now includes the FB coefficients $B_p^{(k,2)}$, p=0, 1, ..., P−1 in the DFE, as shown in FIG. 6. In general, from the second iteration on (i.e. l>1) the DFE$_k$ generates the vector signal $Y^{(k,l)}$ with elements $$Y_p^{(k,l)} = X_p^{(k)} C_p^{(k,l)} + B_p^{(k,l)} \hat{S}_p^{(k,l-1)}, p=0, 1, \ldots, P-1. \quad (14)$$

An algorithm for the iterative design of both FF and FB filters according to the minimum MSE criterion is described in the following The equalization and detection processes are iterated v times, until a reliable decision vector $S^{(k,v)}$ is available which is multiplied by the corresponding channel frequency response to obtain the interference contribution in the FD that must be canceled from the received signal $$V_p^{(k)} = H_p^{(k)} \hat{S}_p^{(k,v)}, p=0, 1, \ldots, P-1. \quad (15)$$

Design Methods. For the design of the DFE filters, minimization of the MSE at the detection point is preferred, which at iteration l=1, 2, ..., v, can be written in the FD as in [25]

$$J^{(k,l)} = \frac{1}{P^2} \sum_{p=0}^{P-1} E\left[\left| C_p^{(k,l)} X_p^{(k)} + B_p^{(k,l)} \hat{S}_p^{(k,l-1)} - S_p^{(k)} \right|^2 \right]. \quad (17)$$

By assuming that both transmitted and detected data are random variables, with zero-mean, and statistically independent from the noise, the expectation in (17) with respect to data and noise signals, yields the MSE $$J^{(k,l)} = \frac{1}{P^2} \sum_{p=0}^{P-1} |C_p^{(k,l)}|^2 M_W + |C_p^{(k,l)} H_p^{(k)} - 1|^2 M_S + |B_p^{(k,l)}|^2 M_S + \quad (18)$$

$$2 \operatorname{Re}[B_p^{(k,l)*}(C_p^{(k,l)} H_p^{(k)} - 1) r^{(k,l)}],$$

where $M_w=PN_0$ is the noise power in the FD, $M_S$ is the power of each element of $S^{(k)}$, and $r^{(k,l)}$ is the correlation between the transmitted data and the detected data at the previous iteration, [23]

$$r^{(k,l)} = E[d^{(k)}(n)\hat{d}^{(k,l-1)*}(n)]. \qquad (19)$$

The correlation depends on the channel and on the noise level and it must be estimated at the receiver. Here we summarize a method, whose details are given in [25], where an estimate of $r^{(k,l)}$ is obtained by $X^{(k)}$ and the FD detected signal at the previous iteration, $S^{(k,l-1)}$, $$\hat{r}^{(k,l)} = \eta \sum_{p=0}^{P-1} \frac{X_p^{(k)}}{H_p^{(k)}} \hat{S}_p^{(k,l-1)*}, \qquad (20)$$

with η being a correction factor (η<1) to reduce the DFE error propagation phenomena.

In this design method, since the reliability of the detected signal at the feedback input is increasing with the number of iterations, the filters will be different at the various iterations. To derive the filters that minimize (18), the constraint that the FB filter removes pre- and post-cursors, but does not remove the desired component, is imposed. In other words, it must be $$\sum_{p=0}^{P-1} B_p^{(k,l)} = 0. \qquad (21)$$

The application of the gradient method to minimize (18), with respect to the FB filter coefficients, which yields $$B_p^{(k,l)} = -\frac{\hat{r}^{(k,l)}}{M_S}[H_p^{(k)}C_p^{(k,l)} - \gamma^{(k,l)}], \; p=0,1,\ldots,P-1, \qquad (22)$$

where $$\gamma^{(k,l)} = \sum_{p=0}^{P-1} H_p^{(k)} C_p^{(k,l)}, \qquad (23)$$

and, for the FF filter coefficients $$C_p^{(k,l)} = \frac{H_p^{(k)*}}{M_W + M_S\left(1 - \frac{|\hat{r}^{(k,l)}|^2}{M_S^2}\right)|H_p^{(k)}|^2}. \qquad (24)$$

Special attention should be paid to the first iteration of the DFE-detector (l=1), which yields different approaches, according to the adopted IC scheme.

FD-SIC. At each SIC stage (i.e., user k detection), for l=1 no tentative decision is available, hence $\hat{r}^{(k,l)}=0$, $B^{(k,l)}=0$ and the FF filter is a linear minimum MSE equalizer.

FD-PIC. At the first PIC iteration (i=1) no tentative decision is available at the first DFE iteration, hence $\hat{r}^{(k,l)}=0$ and $B^{(k,l)}=0$, for k=0, 1, ..., K−1. At the next PIC iterations (i>1), a tentative decision of the previous PIC iteration is available also for l=1 and a DFE can be used for each user.

Figure 8:
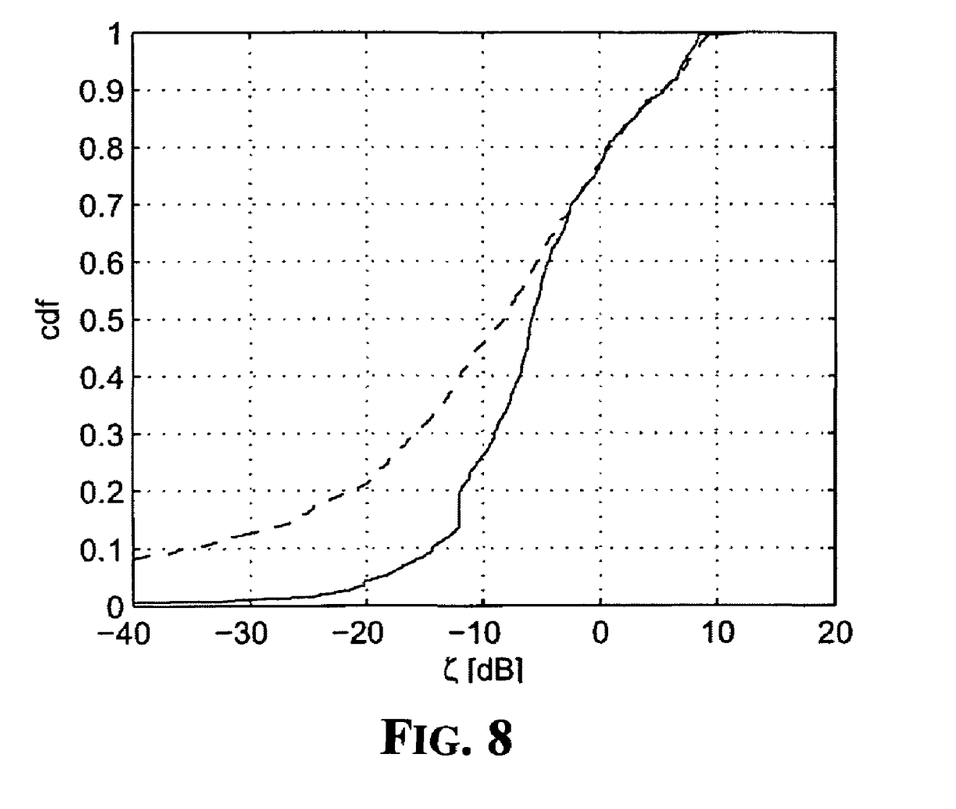
FIG. 8 shows according to the present invention the cumulative distribution function of the normalized power $\zeta$ with (continuous line) and without (dashed line) chip interleaving Walsh codes, with $N_S$=16.

A significant indication of the improvement that the method of the present invention achieves may be gained by observing a comparison between the cumulative distribution function of the normalized power ζ with (continuous line curve) and without (dashed line curve) chip interleaving Walsh codes with NS=16 as shown in FIG. 8.

REFERENCES

[1] H. Holma and A. Toskala, *WCDMA for UMTS: Radio Access for Third Generation Mobile Communications*. New York: Wiley, 2 ed., 2000.

[2] J. G. Proakis, *Digital Communications*. New York: McGraw Hill, 1994.

[3] S. Verd'u, *Multiuser detection*. Cambridge, U.K.: Cambridge Univ. Press, 1998.

[4] A. Klein, "Data detection algorithms specifically designed for the downlink of CDMA mobile radio systems," in *Proc Vehic. Tech. Conf. (VTC)*, pp. 203-207, 1997. [5] I. Ghauri and D. T. M. Slock, "Linear receivers for the DS-CDMA downlink exploiting orthogonality of spreading sequences," in *Proc. 32nd Asilomar Conf. on Signals, Systems and Comp., Asilomar, CA*, pp. 650-654, 1998.

[6] X. Wang and H. V. Poor, "Iterative (Turbo) soft interference cancellation and decoding for coded CDMA," *IEEE Trans. Commun.*, vol. 47, no. 7, pp. 1046-1061, July 1999.

[7] S. R. Chaudry and A. H. Sheikh, "Performance of a dual-rate DS-CDMA-DFE in a overlaid cellular system," *IEEE Trans. Vehic. Tech.*, vol. 48, no. 3, pp. 683-695, May 1999.

[8] M. Abdulrahman, A. U. H. Sheikh, and D. D. Falconer, "Decision feedback equalization for CDMA in indoor wireless communications," *IEEE J. Select. Areas Commun.*, vol. 12, pp. 698-706, May 1994.

[9] L.-M. Chen and B.-S. Chen, "A robust adaptive DFE receiver for DS-CDMA systems under multipath fading channels," *IEEE Trans. Commun.*, vol. 49, no. 7, pp. 1523-1532, July 2001.

[10] Y. Ma and T. J. Lim, "Linear and nonlinear chip-rate minimum mean-square multiuser CDMA detection," *IEEE Trans Commun.*, vol. 49, no. 3, pp. 530-542, March 2001.

[11] J. F. Rossler, L. H.-J. Lampe, W. H. Gerstacker, and J. B. Huber, "Decision-Feedback equalization for CDMA downlink," in *Proc. Vehic. Tech. Conf. (VTC)*, vol. 2, pp. 816-820, 2002.

[12] A. Nahler, R. Irmer, and G. Fettweis, "Reduced and differential parallel interference cancellation for CDMA systems," *IEEE J. Select. Areas Commun.*, vol. 20, no. 2, pp. 237-247, February 2002.

[13] A. M. Chan and G. W. Wornell, "A class of block-iterative equalizers for intersymbol interference channels: fixed channel results," *IEEE Trans. Commun.*, vol. 49, no. 11, pp. 1966-1976, November 2001.

[14] S. Beheshti, S. H. Isabelle, and G. W. Wornell, "Joint intersymbol and multiple-access interference suppression algorithms for CDMA systems," *Euro. Trans. Telecommun.*, vol. 9, no. 5, pp. 403-418, September/October 1998.

[15] N. Benvenuto and S. Tomasin, "On the comparison between OFDM and single carrier modulation with a DFE using a frequency domain feedforward filter," *IEEE Trans. Commun.*, vol. 50, no. 6, pp. 947-955, June 2002.

[16] T. Walzman and M. Schwartz, "Automatic equalization using the discrete frequency domain," *IEEE Trans. Inform. Theory*, vol. 19, no. 1, pp. 59-68, January 1973.

[17] A. Scaglione, G. B. Giannakis, and S. Barbarossa, "Redundant filterbank precoders and equalizers—Part I: Unification and optimal designs, and Part II: Blind channel estimation, synchronization and direct equalization," *IEEE Trans. Sign. Proc.*, vol. 47, no. 7, pp. 1988-2022, July 1999.

[18] M. Huemer, L. Reindl, A. Springer, and R. Weigel, "Frequency domain equalization of linear polyphase channels," in *Proc. Vehic. Tech. Conf.* (*VTC*), vol. 3, pp. 1698-170, May 2000.

[19] L. Deneire, B. Gyselinckx, and M. Engels, "Training sequence versus cyclic prefix—a new look on single carrier communication," *IEEE Commun. Lett.*, vol. 5, no. 7, pp. 292-294, July 2001.

[20] A. L. C. Hui and K. B. Letaief, "Successive interference cancellation for multiuser asynchronous DS/CDMA detectors in multipath fading links," *IEEE Trans. Commun.*, vol. 46, no. 3, pp. 384-391, March 1998. Jul. 21, 2003

[21] R. M. Buehrer, "Equal BER performance in linear successive interference cancellation for CDMA systems," *IEEE Trans. Commun.*, vol. 49, no. 7, pp. 1250-1258, July 2001.

[22] J. Weng, G. Xue, T. Le-Ngoc, and S. Tahar, "Multistage interference cancellation with diversity reception for asynchronous QPSK DS/CDMA systems over multipath fading channels," *IEEE J. Select. Areas Commun.*, vol. 17, no. 12, pp. 2162-2179, December 1999.

[23] D. Divsalar, M. K. Simon, and D. Raphaeli, "Improved parallel interference cancellation for CDMA," *IEEE Trans. Commun.*, vol. 46, no. 2, pp. 258-268, February 1998.

[24] H. Elders-Boll, H. D. Schotten, and A. Busboom, "Efficient implementation of linear multiuser detectors for asynchronous CDMA systems by linear interference cancellation," *European Trans. on Telecommun.* (*ETT*), vol. 9, no. 5, pp. 427-437, September 1998.

[25] N. Correal, M. Buehrer, and B. Woerner, "A DSP-based DS-CDMA multiuser receiver employing partial parallel interference cancellation," *IEEE J. Select. Areas Commun.*, vol. 17, no. 4, pp. 613-630, April 1999.

That which is claimed is:

1. A method for canceling interference at a wireless code division multiple access (CDMA) communication receiver, the wireless CDMA communication receiver receiving a stream of chips generated by spreading data symbols formed by grouping bits of information at a wireless CDMA communication transmitter which are broadcast at a certain chip-rate, the method comprising:
    formatting the stream of chips into distinct blocks of chips at the wireless CDMA communication transmitter;
    spreading each data symbol within the stream of chips, and then interleaving the stream of chips before broadcasting; and
    performing an iterative block decision feedback equalization at the wireless CDMA communication receiver in a frequency domain at the chip-rate of the stream of chips to remove inter-symbol interference by defining a transfer function of feed-forward filters and feedback filters based upon iteration cycles as a function of data detected in a preceding iteration cycle, the iterative block decision feedback equalization being linear equalization when no feedback is available and being non-linear equalization when feedback is available; and
    de-spreading the stream of chips after the equalization, and reconstructing the symbols pertaining to this and other CDMA communication transmitters being reconstructed;
    with a first iteration of the iterative block decision feedback equalization being a linear equalization before the de-spreading and having an inactive feedback signal associated therewith, and with subsequent iterations of the iterative block decision feedback equalization being a non-linear equalization after the de-spreading and having active feedback signals associated therewith.

2. A method according to claim 1, wherein the distinct blocks of chips are separated by a cyclic extension.

3. A method according to claim 1, wherein the distinct blocks of chips are separated by a fixed sequence.

4. A method according to claim 1, wherein the function of data detected in the preceding iteration cycle is based upon a reliability of the data detected.

5. A method according to claim 1, wherein the interleaving is performed by a matrix interleaver in which information chips are written in the matrix interleaver in a column-wise fashion and read therefrom in a row-wise fashion.

6. A method according to claim 1, wherein the formatting, the performing and the interleaving are performed in parallel for multiple CDMA communication transmitters.

7. A method according to claim 1, wherein the formatting, the performing and the interleaving are performed serially for multiple CDMA communication transmitters.

8. A method for canceling interference at a wireless code division multiple access (CDMA) communication receiver, the method comprising:
    operating a wireless CDMA communication transmitter for performing the following
        formatting a stream of chips into distinct blocks of chips, and
        spreading each data symbol within the stream of chips, and then interleaving the stream of chips before broadcasting; and
    operating the wireless CDMA communication receiver for performing the following
        receiving the stream of chips,
        performing an iterative block decision feedback equalization in a frequency domain at the chip-rate of the stream of chips to remove inter-symbol interference by defining a transfer function of feed-forward filters and feedback filters based upon iteration cycles as a function of data detected in a preceding iteration cycle, the iterative block decision feedback equalization being linear equalization when no feedback is available and being non-linear equalization when feedback is available,
        reconstructing symbols pertaining to said CDMA communication transmitter and other CDMA communication transmitters, and
        de-spreading the stream of chips after the equalization, and reconstructing the symbols pertaining to this and other CDMA communication transmitters being reconstructed,
        with a first iteration of the iterative block decision feedback equalization being a linear equalization before the de-spreading and having an inactive feedback signal associated therewith, and with subsequent iterations of the iterative block decision feedback equalization being a nonlinear equalization after the de-spreading and having active feedback signals associated therewith.

9. A method according to claim 8, wherein the distinct blocks of chips are separated by a cyclic extension.

10. A method according to claim 8, wherein the distinct blocks of chips are separated by a fixed sequence.

11. A method according to claim 8, wherein the function of data detected in the preceding iteration cycle is based upon a reliability of the data detected.

12. A method according to claim 8, wherein the filters comprise feed-forward filters and feedback filters.

13. A method according to claim 8, wherein the interleaving is performed by a matrix interleaver in which information chips are written in the matrix interleaver in a column-wise fashion and read therefrom in a row-wise fashion.

14. A method according to claim 8, wherein the formatting, the performing and the interleaving are performed in parallel for multiple CDMA communication transmitters.

15. A method according to claim 8, wherein the formatting, the performing and the interleaving are performed serially for multiple CDMA communication transmitters.

16. A wireless communication system comprising:
   at least one wireless code division multiple access (CDMA) communication transmitter for performing the following
      formatting a stream of chips into distinct blocks of chips, and
      spreading each data symbol within the stream of chips, and then interleaving the stream of chips before broadcasting; and
   at least one wireless CDMA communication receiver for performing the following for canceling interference associated with the transmitted stream of chips
      receiving the stream of chips,
      performing an iterative block decision feedback equalization in a frequency domain at a chip-rate of the stream of chips to remove inter-symbol interference by defining a transfer function of filters based upon iteration cycles as a function of data detected in a preceding iteration cycle, the iterative block decision feedback equalization being linear equalization when no feedback is available and being non-linear equalization when feedback is available,
      reconstructing symbols pertaining to said at least one CDMA communication transmitter and other CDMA communication transmitters, and
      de-spreading the stream of chips after the equalization, and reconstructing the symbols pertaining to this and other CDMA communication transmitters being reconstructed, with a first iteration of the iterative block decision feedback equalization being a linear equalization before the de-spreading and having an inactive feedback signal associated therewith, and with subsequent iterations of the iterative block decision feedback equalization being a non-linear equalization after the de-spreading and having active feedback signals associated therewith.

17. A wireless communication system according to claim 16, wherein the distinct blocks of chips are separated by a cyclic extension.

18. A wireless communication system according to claim 16, wherein the distinct blocks of chips are separated by a fixed sequence.

19. A wireless communication system according to claim 16, wherein the function of data detected in the preceding iteration cycle is based upon a reliability of the data detected.

20. A wireless communication system according to claim 16, wherein the filters comprise feed-forward filters and feedback filters.

21. A wireless communication system according to claim 16, wherein said at least one CDMA communication transmitter comprises a matrix interleaver for performing the interleaving in which information chips are written in the matrix interleaver in a column-wise fashion and read therefrom in a row-wise fashion.

22. A wireless communication system according to claim 16, wherein the formatting, the performing and the interleaving are performed in parallel for multiple CDMA communication transmitters.

23. A wireless communication system according to claim 16, wherein the formatting, the performing and the interleaving are performed serially for multiple CDMA communication transmitters.

* * * * *